Jan. 28, 1936.  W. W. SLOANE  2,029,133
DRIVE MECHANISM FOR SHAKER CONVEYERS
Original Filed May 1, 1933   3 Sheets-Sheet 3

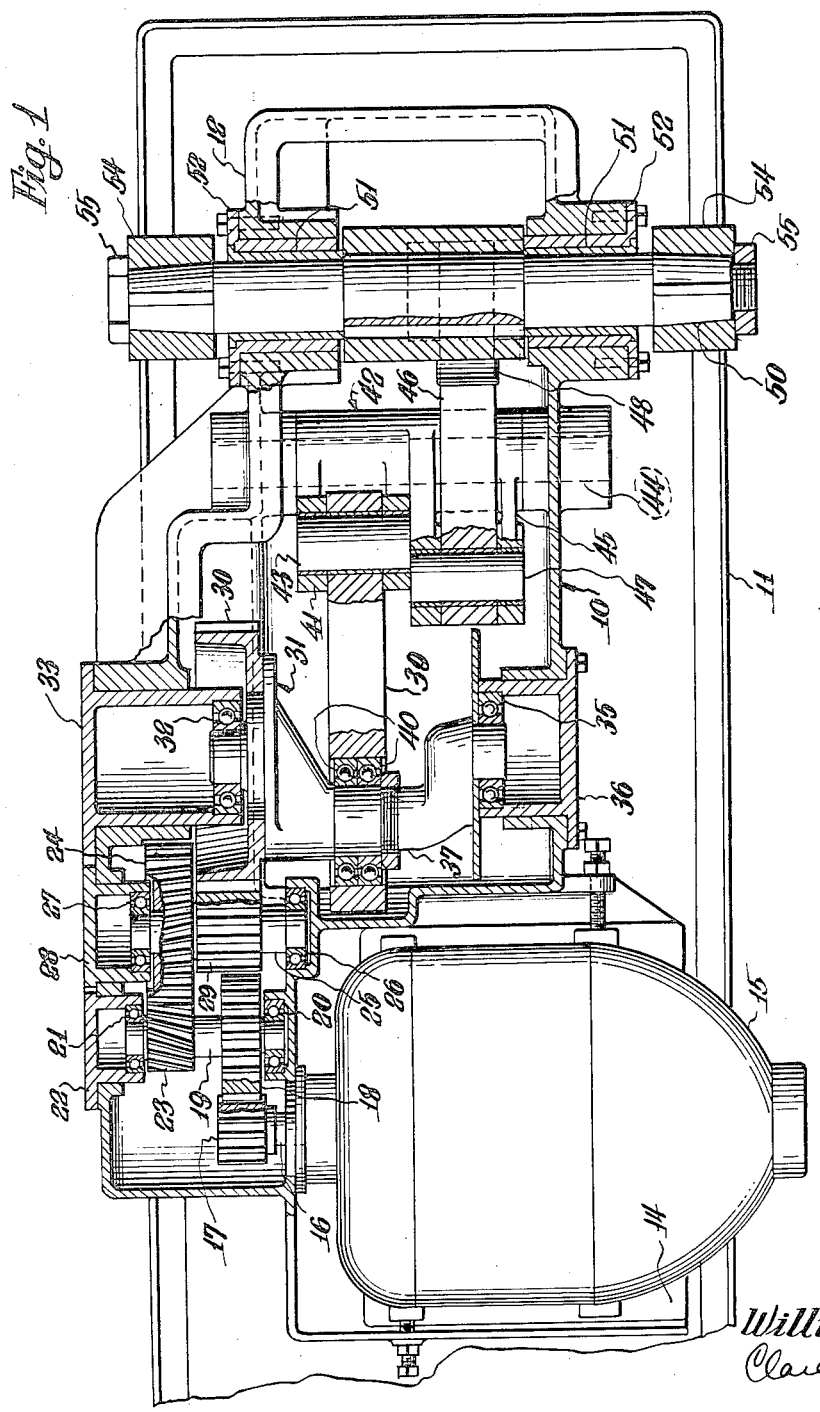

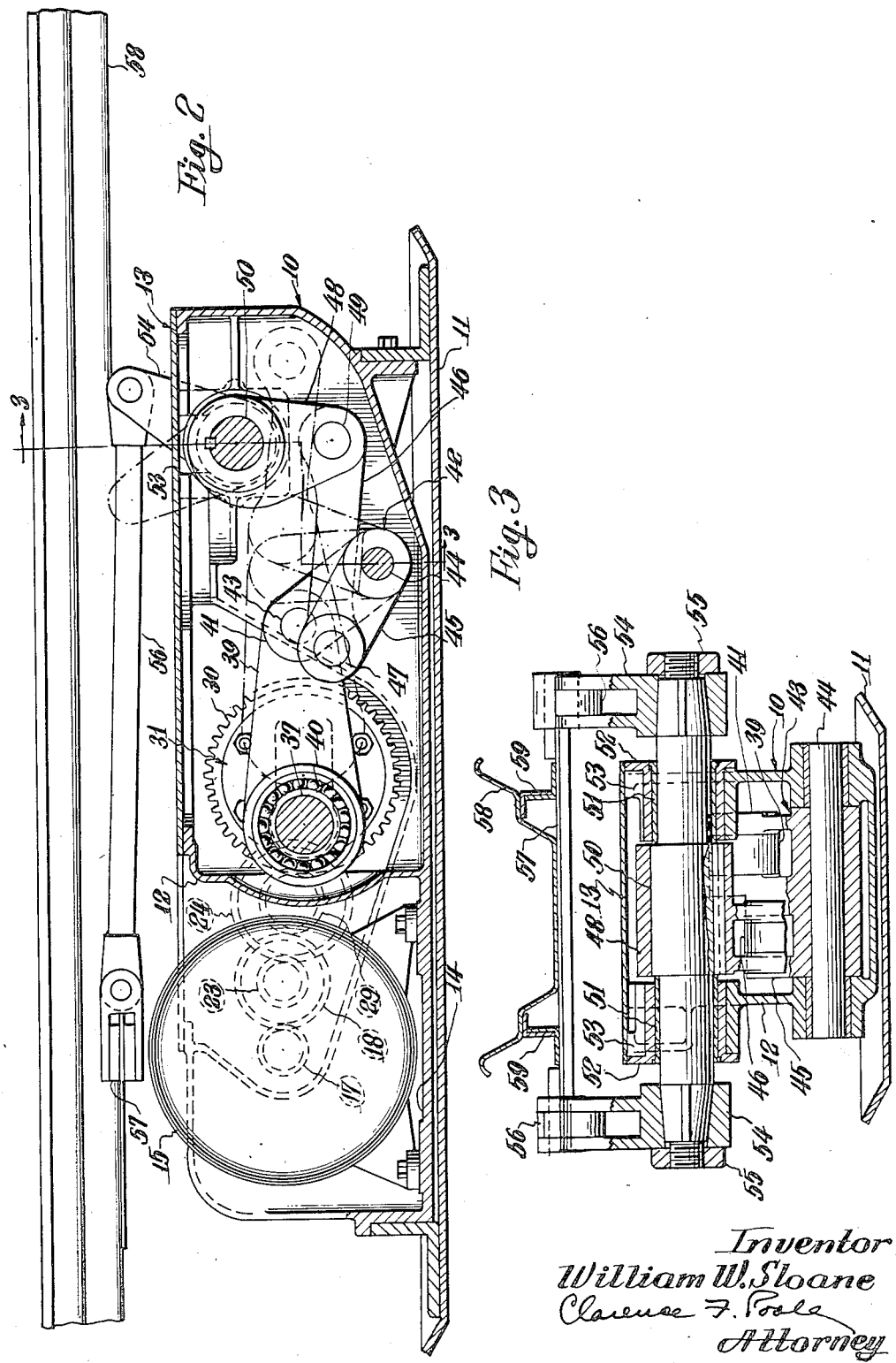

Inventor
William W. Sloane
Clarence F. Poole
Attorney

Patented Jan. 28, 1936

2,029,133

UNITED STATES PATENT OFFICE 2,029,133

DRIVE MECHANISM FOR SHAKER CONVEYERS

William W. Sloane, Chicago, Ill., assignor to Goodman Manufacturing Company, Chicago, Ill., a corporation of Illinois Application May 1, 1933, Serial No. 668,897
Renewed June 19, 1935

5 Claims. (Cl. 74—26)

This invention relates to improvements in drive mechanisms for shaker conveyers of the type utilized for conveying loose material, such as coal.

Among the objects of the invention are to provide new and improved mechanical movements of the character described, whereby a plurality of power transmission devices are interposed between a drive motor and a conveyer trough or pan line, and arranged to transpose the rotary motion of said motor into a rectilinear motion having predetermined changes in acceleration during various parts of the stroke so as to produce a most efficient jigging action for a predetermined maximum driving force for moving material in one direction along the conveyer trough or pan line, which mechanical movement is supported by and enclosed in a housing which is constructed with a view towards utmost accessibility and compactness and is so arranged as to permit interchangeability of the parts of the mechanical movement for changing the drive action of the mechanical movement without alteration of the housing so that different movements of the same general type may be provided for different trough installations.

My invention may be more clearly understood with reference to the accompanying drawings wherein:

Figure 1 is a top plan view of a device embodying my invention with the cover removed and with parts broken away and in section to more clearly show the details thereof;

Figure 2 is a side elevation of the device shown in Figure 1 with certain parts shown substantially in longitudinal section;

Figure 3 is a sectional view taken substantially along line 3—3 of Figure 2;

Like numerals refer to like parts throughout the various figures.

Figure 4:
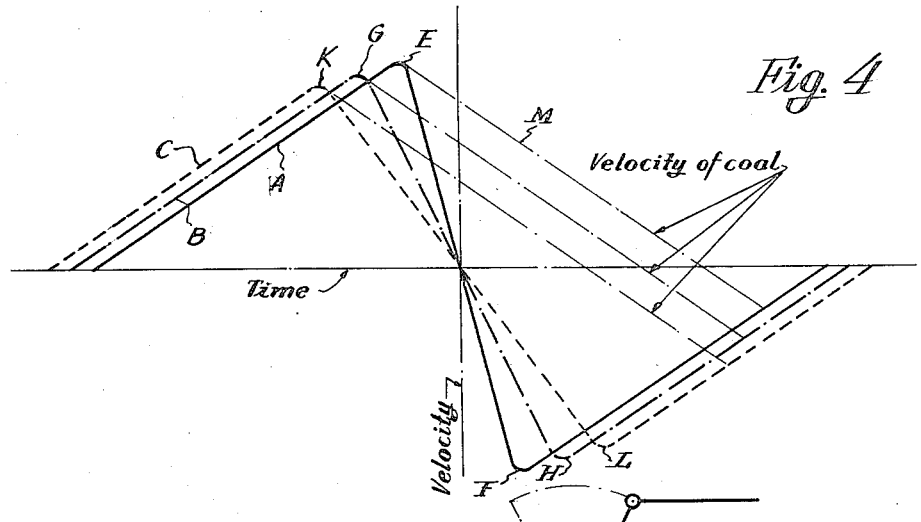
Figure 4 is a diagrammatic view showing several hypothetical velocity curves of shaker motions for various maximum stresses.

Referring now to the details of the embodiment of my invention illustrated in the drawings, a casing 10 is provided which is adapted to be secured to and rest upon a flexible bed plate 11. The flexible bed plate 11 is so constructed that it may conform to an uneven mine floor and be suitably secured thereto when the shaker drive is in operation by holding jacks (not shown) or the like in the usual manner. The casing 10 consists of a main housing 12 adapted to enclose the moving parts of the drive mechanism, a cover 13 adapted to be detachably secured thereto and totally enclose all of the moving parts of the drive mechanism, and a bed frame 14 disposed at one end thereof and forming a support for a motor 15 as is clearly shown in Figures 1 and 2.

The motor 15 is mounted on the bed frame 14 and may be of any type, but is herein preferably shown as being an electric motor having an armature shaft 16 and a drive pinion 17 thereon meshing with a spur gear 18. The drive pinion 17 and spur gear 18 are enclosed by the main housing 12 and cover 13 and said spur gear is keyed on a shaft 19 extending transversely of the casing 10. The shaft 19 is journaled at its inner end in a suitable ball bearing 20 carried in the main housing 12 in a usual manner and is journaled at its opposite end in a suitable ball bearing 21 carried in a bearing housing 22 extending through and carried in a bored portion in one of the outer walls of the main housing 12 and detachably secured thereto in a suitable manner for ready removal of said main housing.

A helical gear 23 is keyed on the shaft 19 adjacent the ball bearing 21 and meshes with and drives a helical gear 24 on a transversely extending shaft 25. The transversely extending shaft 25 is journaled at its inner end in a suitable ball bearing 26 held in the main housing 12 in a suitable manner and is journaled at its opposite end in a suitable ball bearing 27 held in a detachable bearing housing 28, which bearing housing in turn is carried in a bored portion of one of the walls of the main housing 12 and detachably secured thereto in a suitable manner.

A spur gear 29 is keyed on the shaft 25 inwardly of the helical gear 24 and meshes with and drives a spur gear 30 secured to a crank member 31 in a suitable manner. The crank member 31 is journaled at its end adjacent the spur gear 30, within the boundaries of said gear in a suitable ball bearing 32 carried in a bearing housing 33 detachably secured to one of the side walls of the main housing 12 and is journaled at its opposite end in a ball bearing 35 carried in a bearing housing 36, which bearing housing in turn is detachably secured to an opposite side wall of the main housing 12.

The crank member 31 is provided with a crank arm 37, herein shown as being disposed intermediate its ends, which crank arm has one end of a connecting rod 39 journaled thereon by means of suitable ball bearings 40, 40 in a usual manner.

The opposite end of the connecting rod 39 is connected to one lever arm 41 of a bell crank member 42 by means of a pin 43. The bell crank member 42 is carried on a shaft 44 extending transversely of the main housing 12 and journaled at its ends in said main housing adjacent the lower portion thereof in a suitable manner so that a relatively large bearing area is provided for said shaft and bell crank member.

Another lever arm 45 of the bell crank member 42 extends upwardly from the shaft 44 and angularly rearwardly therefrom at a greater angle with respect to the vertical than the lever arm 41. The lever arm 45 is of a shorter length than the lever arm 41 and has a connecting link 46 connected to its free end by means of a pin 47. The opposite end of the connecting link 46 is pivotally connected to the free end of a lever arm 48 by means of a pivot pin 49. The lever arm 48 is keyed on a transversely extending shaft 50 intermediate the ends of said shaft, which shaft in turn is disposed on the opposite side of the connecting link 46 from the shaft 44.

As a preferred form of my construction, the transversely extending shaft 50 is journaled in suitable bearings 51, 51 in such a manner as to provide a relatively large bearing area for said shaft on each side of the lever arm 48. The bearings 51, 51 are carried in bearing housings 52, 52 carried in aligned bored portions of opposite side walls of the main housing 12 and having suitable flanges abutting the outer side of said side walls and secured thereto by means of suitable cap screws in a usual manner. Slots 53, 53 are provided in the sides of the main housing 12 adjacent the bearing housings 52, 52 and extend from the bored portions of said side walls which receive said bearing housings to the top of said side walls to permit the shaft 50 to be readily lifted from the main housing 12 when the cover 13, bearing housings 52, 52, and bearings 51, 51 have been removed therefrom. It should be noted that the bores in the side walls of the main housing 12 are so located and that the flanges of the bearing housings 52, 52 are such that the top portion of said flanges abut the under portion of the cover 13, thus making it possible to completely close the main housing 12 by the cover 13 without providing bearing housings on said cover for the bearings for the shaft 50.

A lever arm 54 is keyed to each end of the shaft 50 outside of the limits of the main housing 12. The lever arms 54 are held to opposite ends of the shaft 50 by means of suitable nuts 55, 55, threaded thereon and said lever arms move at equal angles to a perpendicular line extending through the axis of pivotal movement of the shaft 50, as may clearly be seen with reference to Figure 2, and form a balanced and rugged drive means for the shaker conveyer pan line.

It should be noted that the axis of rotation of the bell crank member 42 is disposed to one side of the longitudinal axis of the connecting link 46 while the axis of rotation of the lever arm 48 is disposed to the opposite side of the longitudinal axis of said connecting link. The purpose of this particular construction is to reduce angular motion of the connecting link 46 and provide a more efficient drive than formerly, as is fully disclosed in my prior application, Serial No. 644,666, filed November 28, 1932, which issued as Patent No. 2,026,103, on December 31, 1935.

A double hinge link 56 is connected to the free end of each lever arm 54 and, as herein shown, said double hinge links preferably extend along and above the casing 10 in a direction towards the motor 15. The free ends of the double hinge links 56, 56 are connected to opposite ends of a suitable cross-member 57 connected with a conveyer trough 58 by suitable bracket members 59, 59 in a usual manner so the conveyer pan line may be disposed directly above the drive mechanism in order to conserve as much floor space as possible, and so that reciprocable movement of the double hinge links 56, 56 will cause reciprocable movement of the conveyer trough 58 in such a manner that the forward stroke of said conveyer trough is gradually accelerated for the greater part of its length and rapidly decelerated for the remainder of its length with the back stroke correspondingly but reversely rapidly accelerated for a relatively short portion of its length and gradually decelerated for the remainder of its length.

Figure 5:
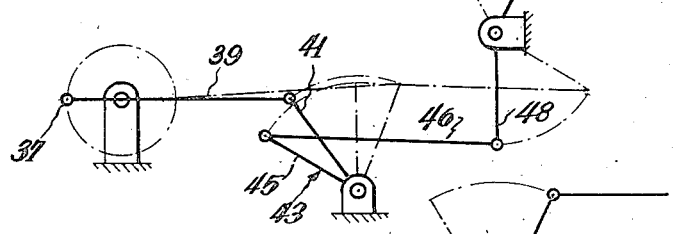
Figures 5, 6, and 7 are diagrammatic views showing several arrangements of the parts for effecting different shaker motions for use with different lengths or weights of the pan line.
Figure 6:
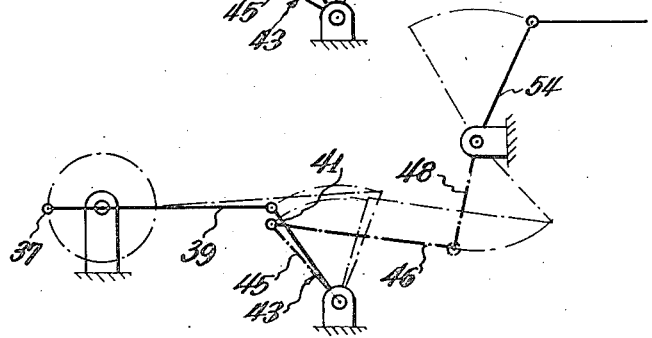
Figure 7:
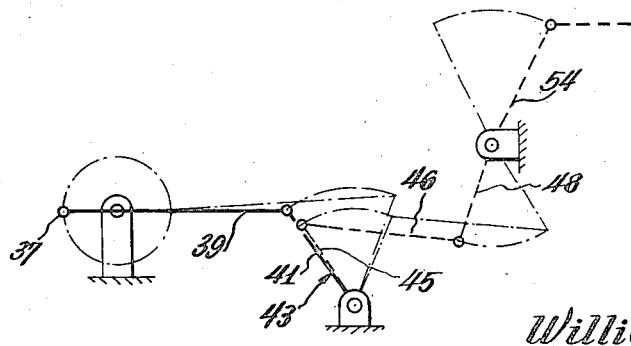

With reference now in particular to Figures 4, 5, 6, and 7, and several other of the novel features of my invention, the velocity curve of the mechanism shown in Figure 5 is indicated hypothetically by curve A shown by solid lines in Figure 4; the velocity curve of the mechanism shown in Figure 6 is indicated hypothetically by curve B shown by dash and dot lines in Figure 4; and the velocity curve of the mechanism shown in Figure 7 is indicated hypothetically by curve C shown by broken lines in Figure 4.

The drive mechanism, diagrammatically shown in Figure 5, is substantially the same as that shown in Figures 1, 2, and 3 and is adapted for use with a relatively short or light conveyer pan line. The velocity of coal movement along the pan line for curve A is represented by line M, which line is drawn tangent to the peak of curve A and is determined in a manner which will not herein be described since it is no portion of my present invention, and also serves as a means for determining the coal movement along the conveyer pan line in a manner which will not herein be described. The line M will only be referred to to the extent of showing the difference in velocity and the resultant coal movement between curves A, B, and C.

With reference now to curve B and the drive mechanism, diagrammatically shown in Figure 6, it should be noted that the throw of the crank arm 37 is the same as that shown in Figure 5 and that the length of the connecting rod 39 is the same as that shown in Figure 5. Furthermore, the distance between the axis of rotation of the crank arm 37 and the bell crank member 42 is the same as that shown in Figure 5, and the distance between the axis of pivotal movement of the bell crank member 42 and the lever arm 46 is the same as that shown in Figure 5, so that the parts diagrammatically shown in Figure 6 may readily be substituted for those shown in Figure 5. The length of the lever arm 45 of the bell crank member 42 has been increased a slight amount and the angle between the lever arms 41 and 45 has been decreased. Similarly, the connecting link 46 has been foreshortened, which in turn causes the angle of the lever arm 48 to the lever arm 54 to be changed. The proportions of these parts have been arrived at to effect a velocity curve wherein the acceleration of the forward stroke is the same as the acceleration of the forward stroke of the drive shown in Figure 5, but wherein the rate of reversal of the drive from the forward to return stroke is less violent. Thus, it is obvious that since the rate of reversal is less violent than with the drive represented by Figure 5, that the maximum forces are less and that the stresses per unit of pan weight on the drive mechanism shown in Figure 6 will be less than those on the mechanism shown in Figure 5, and said mechanism may safely be used for economically moving coal along a pan line of a greater length or weight than the mechanism shown in Figure 5.

Velocity curve C, of the mechanism diagrammatically illustrated in Figure 7, has a less violent rate of reversal from the forward to return stroke than curves A and B, while the accelerating rate for the forward stroke is the same. Thus, the stresses on the mechanism are correspondingly reduced so said mechanism may be effectively used for relatively long pan lines for effecting the maximum coal movement possible commensurate with reasonable stresses on the conveyer drive mechanism.

It should be noted that the axis of rotation of the crank arm 37 and the axis of pivotal movement of the bell crank member 42 is spaced the same as in the mechanism shown in Figures 5 and 6. The axis of pivotal movement of the bell crank member 42 and of the lever arm 48 is likewise spaced the same as in Figures 5 and 6. Thus the mechanism shown in Figure 7 may readily be substituted for the mechanism shown in Figures 5 and 6 with no changes in the casing 10. In order to make these changes, it is only necessary to substitute another bell crank member 42 wherein the angle between the lever arms 41 and 45 is decreased, and wherein the length of the lever arm 45 has been increased a slight amount and substitute a shorter connecting link 46 and shorter lever arm 48, thus increasing the angle between said lever arm and the lever arm 54. The proportions of these parts are mathematically determined in a manner not herein shown nor described since it is no portion of my present invention, to effect a drive having characteristics similar to the drives shown by curves A and B.

It may thus be seen that by the simple transposition of the bell crank member 42, connecting link 46, and lever arm 48 in the casing 10, that said casing is adapted to permit the substitution of a number of different shaker conveyer drive mechanisms of the same general type, each of which drive mechanisms moves coal along a pan line in the most efficient manner possible commensurate with reasonable stresses on said drive mechanism and casing to change the rate of reversal at the end of the forward stroke of the drive mechanism but retain approximately the same rate of acceleration on the forward stroke of the drive mechanism. Thus, the conveyer drive may readily be changed to compensate for an increased or decreased length or weight of pan line making it possible to use one housing for several drive movements and eliminating the necessity of more than one driving mechanism for varying conditions or lengths of pan line.

It may also be seen that the device of my invention is so arranged that a balanced drive has been provided wherein the parts are movable about horizontal axes so that a maximum bearing area may be provided for the moving parts in a simplified manner; that all of the parts thereto are readily accessible and may be quickly removed when it is desired to change the drive; that the cover for the casing forms no bearing support for the conveyer drive mechanism nor does it have any drive mechanism extending therethrough, permitting accessibility of the parts to the drive mechanism for ready inspection, substitution of parts, or repair; and that the mechanism is of a relatively compact arrangement suitable for use in confined spaces, especially those spaces in which the floor room is restricted.

While I have herein shown and described one form in which my invention may be embodied, it will be understood that the arrangement of the various parts and the construction thereof may be altered or changed without departing from the spirit and scope thereof. Furthermore, I do not wish to be construed as limiting myself to the specific embodiment illustrated, excepting as it may be limited by the appended claims.

I claim as my invention:

1. A casing for shaker conveyer drives including side and end walls and a detachable cover, bearing support means in the sides of said casing, a rotatable crank journaled therein, other bearing support means in the sides of said casing, a bell crank member journaled therein for rocking movement with respect thereto, a third set of bearing support means in the sides of said casing, a rocking member journaled therein, a connection between said bell crank member and rocking member, and a connection between said rocking member and a conveyer trough for reciprocably driving said conveyer trough at a predetermined variable acceleration, said casing being so arranged and constructed that other rocking and connecting members may be interchanged with said first-mentioned members for changing the conveying action of said conveyer trough without changing said bearing means.

2. A casing for shaker conveyer drives including side and end walls and a detachable cover, bearing support means in the sides of said casing, a rotatable crank journaled therein, other bearing support means in the sides of said casing, a bell crank member journaled therein for rocking movement with respect thereto, a third set of bearing support means in the sides of said casing, a shaft journaled therein and extending beyond the sides of said casing, a rocking member on said shaft between the side walls of said casing, a connection between said bell crank member and rocking member, another rocking member adapted to be connected to an end of said shaft, a connection between said last-mentioned rocking member and a conveyer trough for reciprocably driving said conveyer trough at a predetermined variable acceleration, said casing being so arranged and constructed that other rocking and connecting members may be interchanged with said first-mentioned members for changing the conveying action of said conveyer trough without changing said bearing means.

3. A casing for shaker conveyer drives including a bottom, side and end walls and a detachable cover, bearing support means carried in the sides of said casing, a rotatable crank journaled therein, other bearing support means carried in the sides of said casing, a bell crank member carried thereby for rocking movement with respect thereto, a third set of bearing support means carried in the sides of said casing, a shaft extending beyond the sides of said casing journaled therein, a rocking member on said shaft between the side walls of said casing, a connection between said bell crank member and rocking member, another rocking member adapted to be connected to the ends of said shaft, a connection between said rocking member and a conveyer trough for reciprocably driving said conveyer trough at a predetermined variable acceleration for the greater portion of the forward stroke thereof, said casing being so arranged and constructed that other rocking and connecting members may be interchanged with said first mentioned member for modifying the conveying action of said conveyer trough without changing said bearing means in said casing or the rate of acceleration of said conveyer trough on the forward stroke.

4. In a shaker conveyer operating mechanism, a casing, said casing including a bottom, side, and end walls and a detachable cover, a rotating operating member carried by said casing independently of said cover, a pivotally movable device carried by said casing independently of said cover, aligned bores in opposite side walls of said casing, a shaft journaled therein and reciprocated by said rotatable member and having driving connection with a conveyer trough, slots extending upwardly from said bores to permit the removal of said shaft, and bearing members carried in said bores having flanges engaging the under surface of said cover.

5. In a shaker conveyer drive, a rotating operating member, a horizontal shaft, a connection between said shaft and said rotating operating member for rocking said shaft, a reciprocably movable driven member operatively connected to one end of said shaft, and a casing for said shaker conveyer drive including a bottom, side, and end walls, and a detachable cover, said shaker conveyer drive mechanism being journaled in said casing independently of said cover and the bearing means for said drive mechanism including aligned bores in opposite side walls of said casing, bearing means for said shaft carried therein, slots extending upwardly from said bores to permit removal of said shaft, said bearing means for said shaft having flanges secured to the outer side walls of said casing and abutting the under surface of said cover in alignment with said slots and serving as a closure means for said slots.

WILLIAM W. SLOANE.